United States Patent [19]
Yoshida

[11] Patent Number: 6,116,308
[45] Date of Patent: Sep. 12, 2000

[54] RUN-FLAT TIRE SYSTEM

[75] Inventor: Shu Yoshida, Akashi, Japan

[73] Assignee: Sumitomo Rubber Industries, Ltd., Hyogo-Ken, Japan

[21] Appl. No.: 09/124,068

[22] Filed: Jul. 29, 1998

[30] Foreign Application Priority Data

Jul. 30, 1997 [JP] Japan ................................. 9-204802

[51] Int. Cl.$^7$ ................................................. B60C 17/06
[52] U.S. Cl. ........................... 152/158; 152/157; 152/313; 152/319; 152/320; 152/322; 152/324; 152/325; 152/327
[58] Field of Search .................................. 152/157, 158, 152/520, 203, 204, 165, 310, 311, 312, 313, 314, 315, 316, 318, 319, 320, 321, 322, 324, 325, 327, 328, 329

[56] References Cited

U.S. PATENT DOCUMENTS

| | | | |
|---|---|---|---|
| 1,064,766 | 6/1913 | Pfouts | 152/157 |
| 1,253,752 | 1/1918 | Wais | 152/157 |
| 1,413,189 | 4/1922 | Rapson | 152/157 |
| 3,022,810 | 2/1962 | Lambe | 152/157 |
| 3,095,917 | 7/1963 | Arsandaux | 152/312 |
| 4,681,147 | 7/1987 | Hugele | 152/158 |

FOREIGN PATENT DOCUMENTS 8-164719   6/1996   Japan .

*Primary Examiner*—Michael W. Ball
*Assistant Examiner*—Barbara Musser
*Attorney, Agent, or Firm*—Birch, Stewart, Kolasch & Birch, LLP

[57] ABSTRACT

A run-flat tire system comprising a tire and an tire core disposed therein, the tire core being an annular body of an elastic closed-cell material, the radially outside and inside of the tire core each provided with a circumferentially extending groove, the radially inner groove extending radially outwardly beyond a bead core line being drawn between the centers of the bead cores. When the tire is mounted on a standard rim, the radially outer groove forms a radially outer space extending circumferentially of the tire and having a cross sectional area of from 1 to 6% of the total sectional area of the tire cavity, and the radially inner groove forms a radially inner space extending circumferentially of the tire having a cross sectional area Si of from 10 to 25% of the total sectional area S of the tire cavity.

19 Claims, 3 Drawing Sheets

RUN-FLAT TIRE SYSTEM

The present invention relates to a run-flat tire system, more particularly to an improved tire core disposed in a pneumatic tire to support a tire load when the tire air pressure is low.

As measures for run-flat, it will be conceivable that the inside of a pneumatic tire is filled with an elastic material having rigidity in some degree which is enough to support the tire load when the tire air pressure is decreased. In this case, due to the rigidity of the filled material or tire core, it is difficult to move or bent the bead portions axially inward. Such action is however necessary for mounting the tire on a wheel rim. Therefore, it is difficult to mount the tire on a rim. Further, during running, the outer surface of the tire core rubs against the inner surface of the tire. As a result, the temperature rise is especially remarkable in the tread portion, and the raised temperature reaches to such a high degree that plastics and synthetic resins are melted.

It is therefore, an object of the present invention to provide a run-flat tire system, in which the temperature rise of a tire core is suppressed and the rim mounting operation is improved without decreasing the ability to run-flat.

According to one aspect of the present invention, a run-flat tire system comprising a tire and a tire core disposed therein, the tire comprising a tread portion, a pair of sidewall potions and a pair of axially spaced bead portions with a bead core therein and having a toroidal shape, the tire core being an annular body of an elastic closed-cell material, the radially outside and inside of the tire core each provided with a circumferentially extending groove, the radially inner groove extending radially outwardly beyond a bead core line drawn between the centers of the bead cores.

When the tire is mounted on a standard rim, the radially outer groove forms a radially outer space extending circumferentially of the tire and having a cross sectional area being 1 to 6% of the total sectional area of the tire cavity, and the radially inner groove forms a radially inner space extending circumferentially of the tire having a cross sectional area being 10 to 25% of the total sectional area S of the tire cavity.

Incidentally, the tire cavity is a cavity surrounded by the inner surface of the tire and the inner surface of the wheel rim when the tire is mounted on the rim. The standard rim is the "standard rim" specified in JATMA, the "Measuring Rim" in ETRTO, the "Design Rim" in TRA or the like.

Therefore, the contact area of the tire core with the tire and a wheel rim is decreased by the presence of the radially outer and inner grooves. Accordingly, the heat generated during running decreases. Further, the generated heat is diffused by the radially inner and outer spaces, and a heat break down of the tire core is controlled to improve the durability.

As the radially inner groove extends beyond the bead core line, it is relatively easy to move or bent the bead portions axially inwardly to mount the tire on a rim though the tire core is inserted in the tire. Therefore, the working efficiency is greatly improved.

Embodiments of the present invention will now be described in detail in conjunction with the accompanying drawings.

Figure 1:
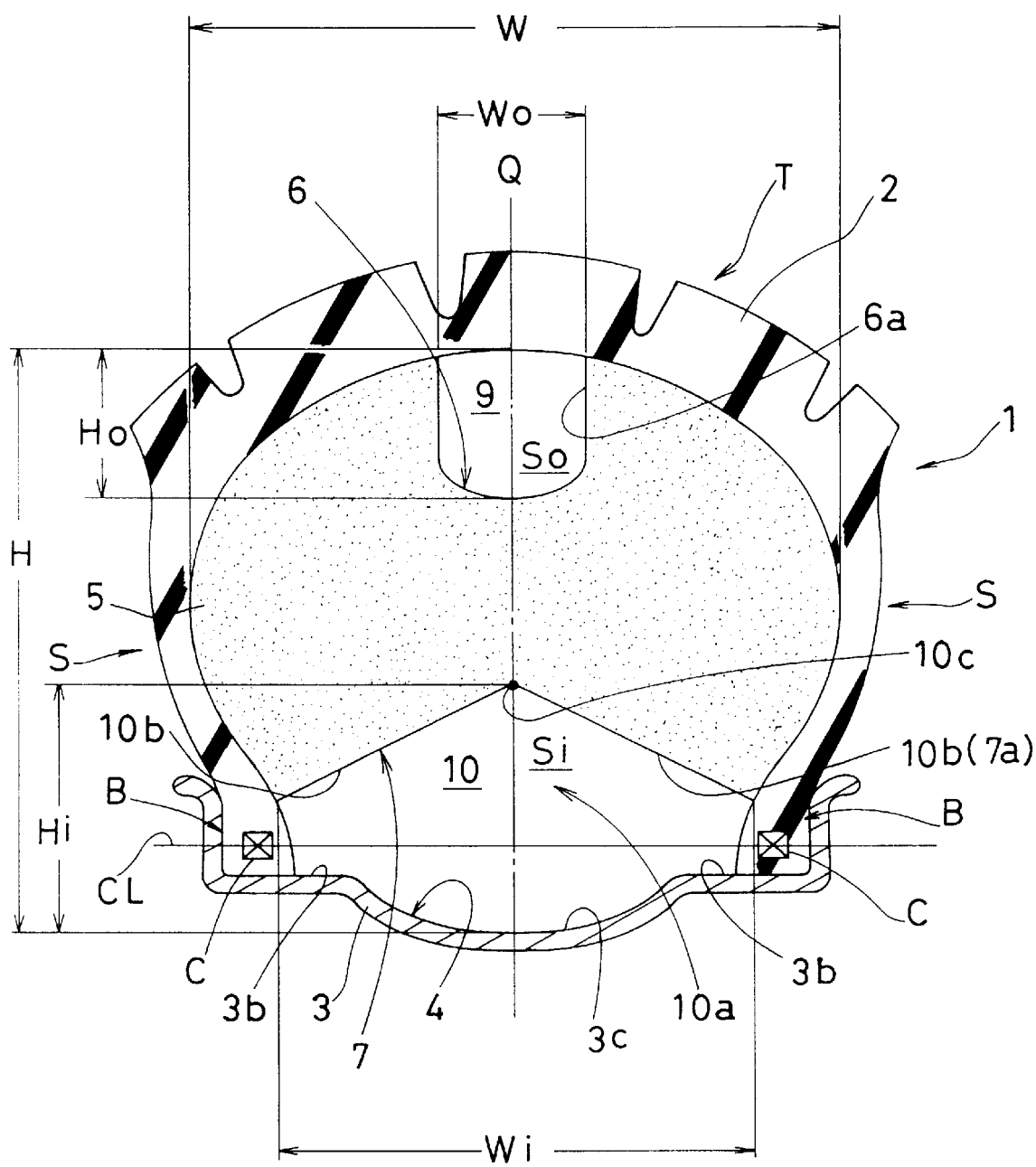
FIG. 1 is a cross sectional view of an assembly of a tire, tire core and wheel rim showing an embodiment of the present invention.
Figure 2:
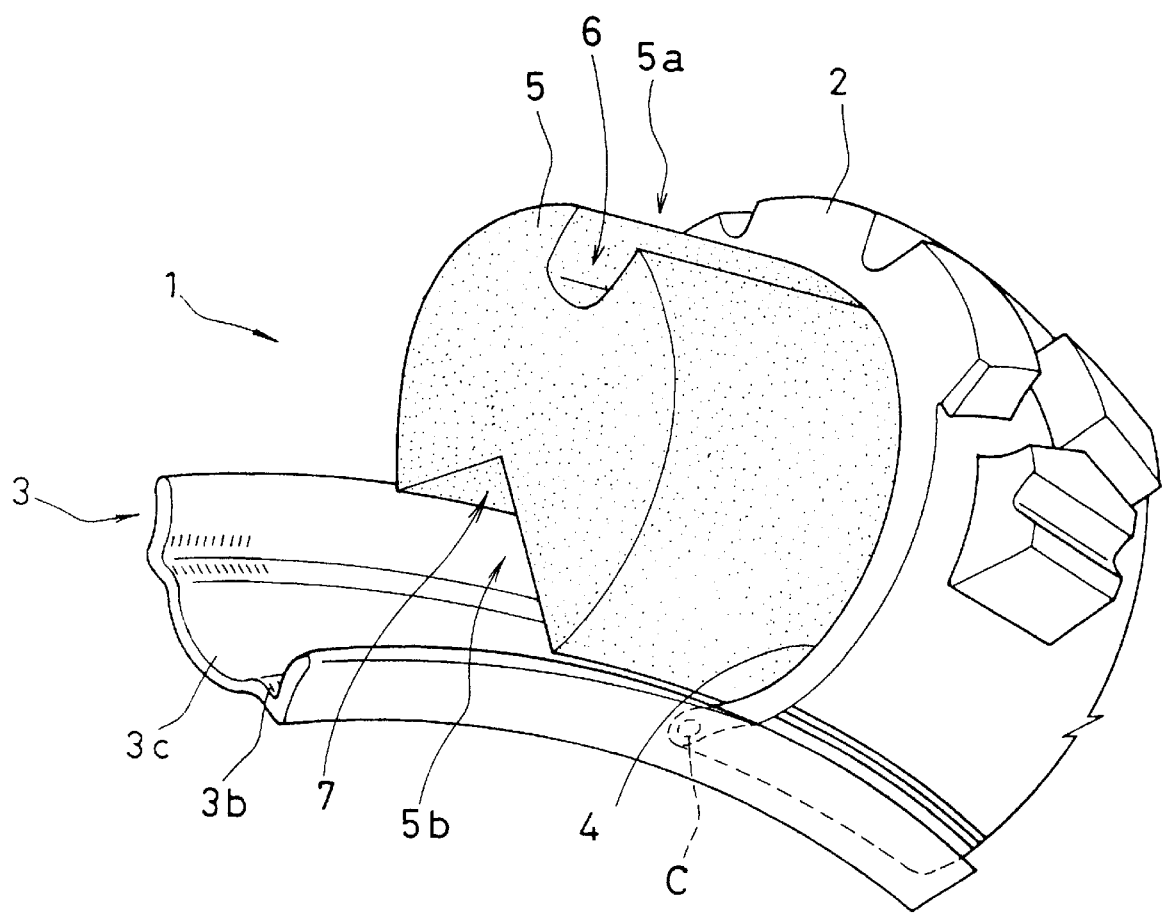
FIG. 2 is a partial perspective view of the assembly.

In the drawings, the assembly 1 comprises a pneumatic tire 2, a wheel rim 3 on which the tire is mounted and a tire core 5 disposed in the tire cavity.

The tire 2 comprises a tread portion T, a pair of axially spaced bead portions B with a bead core C therein, a pair of sidewall portions S, a carcass extending between the bead portions B and reinforced by for example an organic fiber cord ply (not shown). In this example, the tire 2 is an off-road tire for motorcycles whose tread portion is provided with a block type tread pattern.

The wheel rim 3 is a standard rim for the tire and comprises a pair of axially spaced bead seats 3b, a rim well 3c therebetween, and a pair of flanges extending from the axially outer ends of the bead seats.

The tire core 5 is an annular body of an elastic closed-cell material. In this example, a sponge rubber having an expansion rate of from 400 to 1500%, preferably 400 to 1100% is used. For the rubber material therefor, preferably, butyl rubber compounds such as butyl rubber, brominated butyl rubber, halogenated butyl rubber and the like are used. If the expansion rate is less than 400%, the shock absorption by the tire core 5 becomes insufficient and ride comfort is not good. If the expansion rate is more than 1500%, the load support by the tire core 5 becomes impossible and stability during straight running and cornering is lost.

The specific gravity of the tire core 5 is preferably in the range of from 0.1 to 0.3.

Further, the surface of the tire core 5 has a JIS-C hardness of from 10 to 35 degrees, preferably 10 to 30 degrees, whereby the road grip and tire rigidity during cornering are improved. Thus it becomes possible to increase the critical cornering speed and also to improve the handling performance.

The tire core 5 is provided in the surface with circumferentially extending hollow parts or grooves 6 and 7. The radially outer groove 6 is disposed in the radially outside 5a to form a space 9 from the tire 2, and the radially inner groove 7 is disposed in the radially inside 5b to form a space 10 from the wheel rim 3 when the tire 2 is mounted on the wheel rim 3. The radially outer space 9 and radially inner space 10 extend continuously in the tire circumferential direction. Therefore, the spaces 9 and 10 function as cooling ventilation.

The radially outer groove 6 has a U-shaped sectional shape. As a result, the sectional shape of the radially outer space 9 is rounded but generally rectangular as shown in the FIGS. 1 and 3.

The radially outer space 9 has a sectional area So which is preferably in the range of from 1 to 6%, more preferably 3 to 6% of the total sectional area S of the tire cavity. If the area So is less than 1% of the area S, the cooling effect and heat radiation decrease. If more than 6%, it is difficult to obtain a required rigidity for the tread portion T, and further it is difficult to support the the tire load when the tire is punctured. Therefore, the steering stability decreases.

Preferably, the radially outer space 9 has a maximum radial height Ho along the tire equatorial plane Q which is less than 20% of the section height H of the tire cavity 4, and a maximum axial width Wo which is less than 20% of the section width W of the tire cavity 4. If the depth Ho is more than 20% of the height H and/or the width Wo is more than 20% of the width W, the rigidity decreases in the tread portion T and the steering stability is liable to deteriorate.

The radially inner space 10 extends radially outwardly beyond a bead core line CL, the bead core line CL being a straight axial line drawn between the centers of the bead cores C. Due to the presence of the part 10a radially outward of the bead core line CL, a hindrance to the bead movements during rim mounting is removed and the mounting operation becomes easier.

The maximum radial height Hi of the inner space 10 occurs along the tire equatorial plane Q and it is in the range of from 27 to 45% of the section height H. If the height Hi is less than 27% of the height H, the rim mounting operation is liable to become difficult. If the height Hi is more than 45% the height H, the bead portions B are liable to be displaced into the rim well 3c when the tire pressure is low.

Further, the radially inner space 10 has a sectional area Si which is preferably in the range of from 10 to 35%, preferably 10 to 25% of the sectional area S of the tire cavity 4. If the area Si is less than 10% of the area S, the rim mounting operation is liable to become difficult. If more than 25%, it becomes difficult to support the tire load when punctured and sometimes the steering stability decreases.

Usually, the radially outer and inner spaces 9 and 10 are substantially symmetrical with respect to the tire equator Q.

In FIG. 1, the radially inner groove 7 has a V-shaped cross sectional shape where the two straight sides 10b extend from a point 10c on the tire equator Q. The axial width of the inner groove 7 increases radially inwardly from the peak point 10c to the radially inner end. In this example, the radially inner ends of the two sides 10b are positioned on the inner surface of the tire and radially outward of the bead cores C. As a result, it becomes relatively easy to move the bead portions B during mounting the tire on the rim. The cross sectional shape of the radially inner space 10 is a generally folding-fan shape. The maximum axial width Wi of the radially inner space 10 is in the range of from 27 to 80%, preferably 27 to 70%, more preferably 27 to 55% of the section width W of the tire cavity. If the width Wi is less than 27% of the width W, the rim mounting operation is liable to become difficult. If the width Wi is more than 80% of the width W, the bead portions B are liable to be displaced into the rim well 3c when the tire pressure is low.

Figure 3:
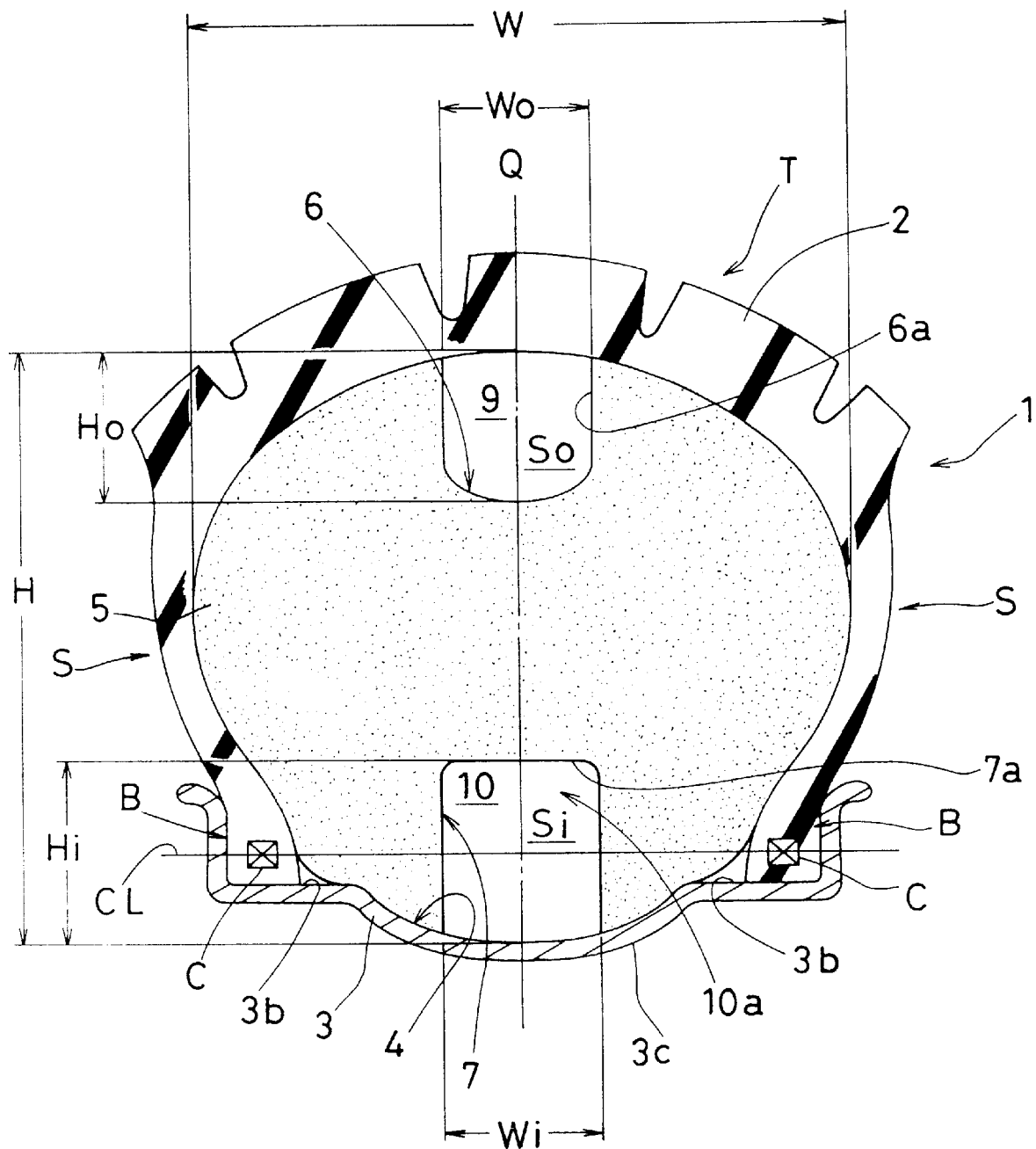
FIG. 3 is a cross sectional view of an assembly of a tire, tire core and wheel rim showing another embodiment of the present invention.

In FIG. 3, the radially inner groove 7 has a U-shaped cross sectional shape wherein the two oppositely opposed sides are parallel with the tire equator Q and the radially inner ends thereof are positioned on the inner surface of the rim. Thus the axial width Wi is substantially constant from the rim to the groove bottom. The axial width Wi of the radially inner space 10 is in the range of from 27 to 70%, preferably 27 to 45% of the section width W of the tire cavity. If the width Wi is less than 27% of the width W, the rim mounting operation is liable to become difficult. If the width Wi is more than 70% of the width W, the bead portions B are liable to be displaced into the rim well 3c when the tire pressure is low. In this example, the bead displacement is effectively prevented, and the tire rigidity is increased to improve the steering stability.

In any case, the surface of the tire core 5 except for the grooved part contacts with the inner surface of the tire 2 and the inner surface of the rim 3 (in case of FIG. 3). Therefore, a lubricant is preferably applied to the surface of the tire core 5. For the lubricant, for example, silicon grease whose starting torque is 1000 to 1200 gf·cm and running torque is 200 to 400 gf·cm measured at −60 degrees C according to JIS K 2220 is preferably used.

The above-mentioned tire core 5 is made of a single rubber compound. However, it is possible to make it as a plurality of layers of different rubber compounds.

Comparison Test

Various tire cores were made and assemblies of a tire (size: 3.00-10 2PR) for motor scooters and a standard rim (size: 10×2.15) and the tire cores were tested for the durability, rim mounting, steering stability, bead displacement.

Durability Test

The durability was evaluated according to the Japanese Industrial Standard K-6366. In Table 1, tires cleared the test without any damage are indicated as "pass".

Rim Mounting Test

A skilled worker mounted the tire with each tire core therein on the rim by hand using a tire lever, and the difficulty was evaluated into five ranks, wherein the higher the rank, the easier the rim-mounting operation.

Steering Stability Test

Running a 90 cc scooter in a test course, total running performance during cornering, acceleration and braking and at the time of quick braking was evaluated into five ranks by the test rider's feelings, wherein the higher the rank, the better the performance. Further, the tires were checked if the bead portions were displaced during test running.

TABLE 1

|  | Ex. 1 | Ex. 2 | Ex. 3 | Ex. 4 | Ex. 5 | Ex. 6 | Ex. 7 | Ref. 1 | Ref. 2 |
| --- | --- | --- | --- | --- | --- | --- | --- | --- | --- |
| Tire-core |  |  |  |  |  |  |  |  |  |
| Type | FIG. 1 | FIG. 1 | FIG. 1 | FIG. 3 | FIG. 3 | FIG. 3 | FIG. 3 | FIG. 3 | — |
| Outer space |  |  |  |  |  |  |  |  | non |
| So/S (%) | 2.5 | 4.1 | 5.8 | 2.5 | 2.5 | 4.7 | 6.1 | 0.76 |  |
| Ho/H (%) | 15.3 | 18.6 | 20.3 | 15.3 | 15.3 | 19.2 | 21.8 | 7.7 |  |
| Wo/W (%) | 12.8 | 18.6 | 20.3 | 12.8 | 12.8 | 19.2 | 21.8 | 7.7 |  |
| Inner space |  |  |  |  |  |  |  |  | non |
| Si/S (%) | 33.2 | 30.5 | 24.3 | 11.5 | 28.5 | 11.5 | 23 | 8.4 |  |
| Hi/H (%) | 36.3 | 31.7 | 28.1 | 28.2 | 38.5 | 28.2 | 42.3 | 25.7 |  |
| Wi/W (%) | 58.1 | 50 | 43.7 | 32.1 | 57.7 | 32.1 | 42.3 | 25.7 |  |
| Part outward of bead core line | exist | exist | exist | exist | exist | exist | exist | non |  |
| Test Results |  |  |  |  |  |  |  |  |  |
| Durability | pass | pass | pass | pass | pass | pass | pass | fail | fail |
| Rim mounting | 4.5 | 4.3 | 4 | 3.5 | 4 | 3.5 | 3.8 | 2.5 | 1 |
| Steering stability | 3 | 3.3 | 3.4 | 4 | 3.1 | 3.7 | 3 | 4.2 | 4.5 |
| Displacement | occurred | non | non | non | occurred | non | non | non | non |

Preferably, the embodiment shown in FIG. 1 is applied to a pneumatic tire used with a low pressure of less than 1 kgf/sq.cm. The embodiment shown in FIG. 3 is preferably applied to a pneumatic tire used with a air pressure of not less than 1 kgf/sq.cm. As mentioned above, the present invention is suitably applied to a off-the-road motorcycle tire, but it is also possible to apply a pneumatic tires for four-wheel vehicles.

What is claimed is:

1. A run-flat tire system comprising a tire and a tire core disposed therein, the tire comprising a tread portion, a pair of sidewall portions and a pair of axially spaced bead portions with a bead core therein and having a toroidal shape, the tire core being an annular body of an elastic closed-cell material, the radially outside and inside of the tire core each provided with a circumferentially extending groove, the radially inner groove extending radially outwardly beyond a bead core line, the bead core line defined as a straight axial line drawn between the centers of the bead cores, and wherein when the tire is mounted on a standard rim, the radially outer groove forms a radially outer space extending circumferentially of the tire and having a cross-sectional area of from 1 to 6% of the total sectional area of the tire cavity, and the radially inner groove forms a radially inner space extending circumferentially of the tire having a cross-sectional area (Si) of from 10 to 25% of the total sectional area (S) of the tire cavity.

2. The run-flat tire system according to claim 1, wherein the radially outer space has a section height (Ho) being less than 20% of the section height (H) of the tire cavity and the radially inner space has a section height (Hi) being 27 to 45% of the section height (H).

3. The run-flat tire system according to claim 1, wherein the radially outer groove has a substantially U-shaped cross section.

4. The run-flat tire system according to claim 1, wherein the radially inner groove has a substantially V-shaped cross section.

5. The run-flat tire system according to claim 1, wherein the radially inner groove has a substantially U-shaped cross section.

6. The run-flat tire system according to claim 1, wherein the tire is a motorcycle tire.

7. The run-flat tire system according to claim 1, wherein the tire core is made of a butyl rubber compound whose expansion rate is in the range of from 400 to 1500%.

8. The run-flat tire system according to claim 1, wherein the surface of the tire core has a JIS-C hardness of from 10 to 35 degrees.

9. The run-flat tire system according to claim 2, wherein the radially outer groove has a substantially U-shaped cross-section.

10. The run-flat tire system according to claim 2, wherein the radially inner groove has a substantially V-shaped cross-section.

11. The run-flat tire system according to claim 3, wherein the radially inner groove has a substantially V-shaped cross-section.

12. The run-flat tire system according to claim 2, wherein the radially inner groove has a substantially U-shaped cross-section.

13. The run-flat tire system according to claim 3, wherein the radially inner groove has a substantially U-shaped cross-section.

14. The run-flat tire system according to claim 2, wherein the tire is a motorcycle tire.

15. The run-flat tire system according to claim 3, wherein the tire is a motorcycle tire.

16. The run-flat tire system according to claim 2, wherein the tire core is made of a butyl rubber compound whose expansion rate is in the range of from 400 to 1500%.

17. The run-flat tire system according to claim 3, wherein the tire core is made of a butyl rubber compound whose expansion rate is in the range of from 400 to 1500%.

18. The run-flat tire system according to claim 2, wherein the surface of the tire core has a JIS-C hardness of from 10 to 35 degrees.

19. The run-flat tire system according to claim 3, wherein the surface of the tire core has a JIS-C hardness of from 10 to 35 degrees.

* * * * *